Dec. 3, 1935.     O'NEAL W. CHANDLER     2,023,122
BUTTER SLICING MACHINE
Filed Sept. 14, 1931     3 Sheets—Sheet 1
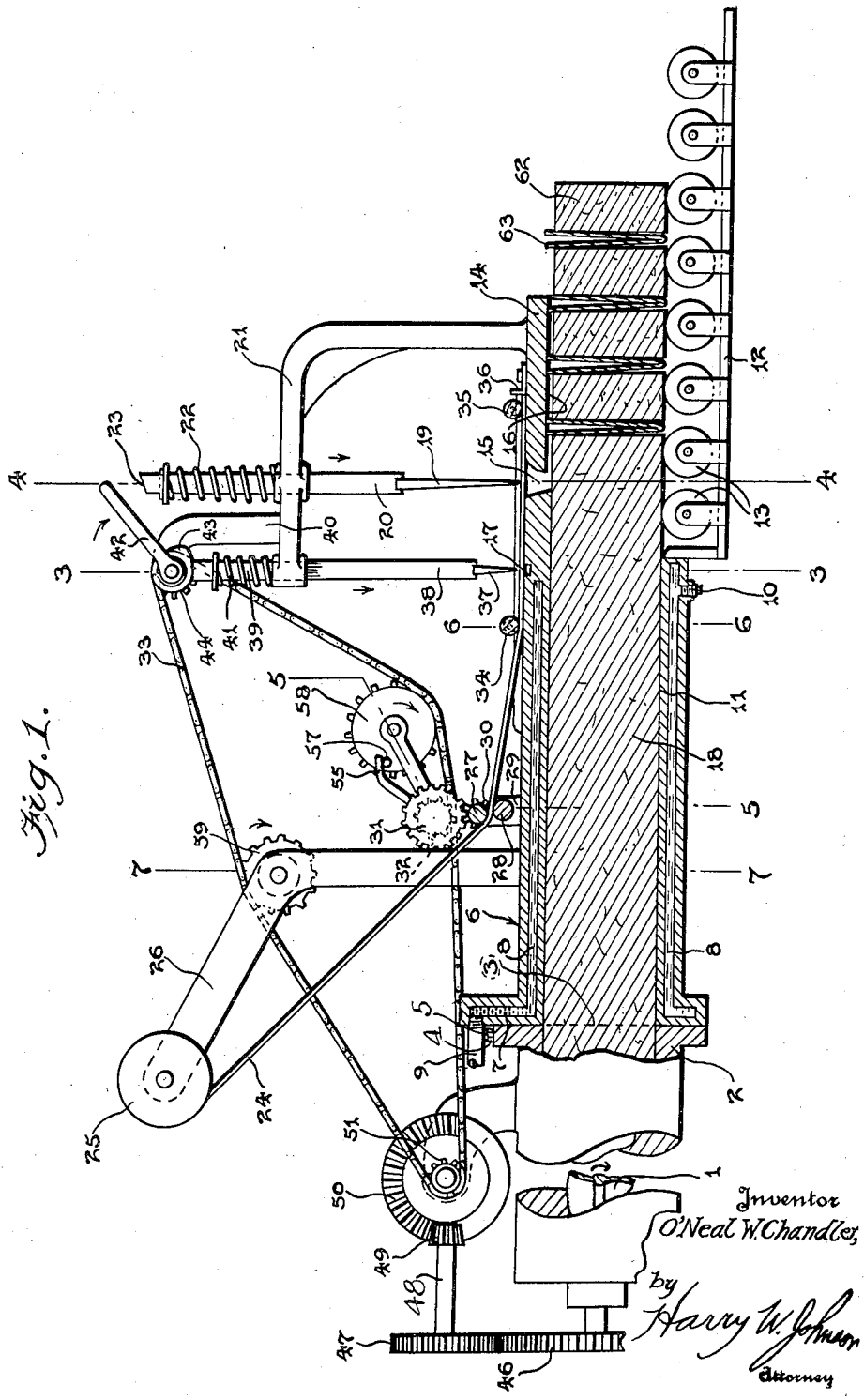

Dec. 3, 1935.  O'NEAL W. CHANDLER  2,023,122
BUTTER SLICING MACHINE
Filed Sept. 14, 1931   3 Sheets-Sheet 2
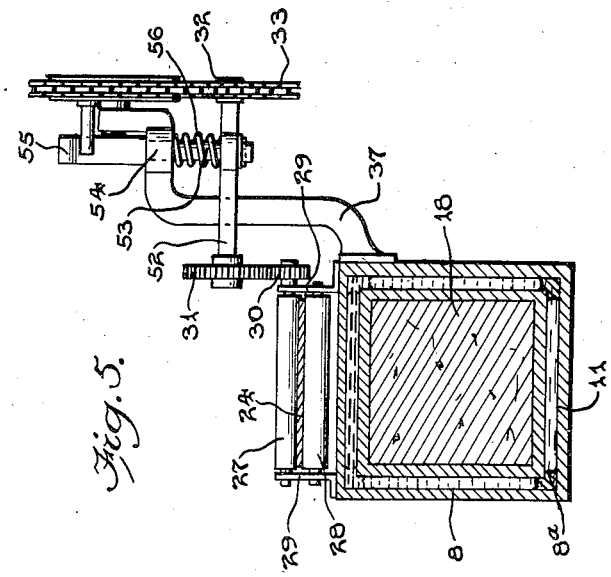
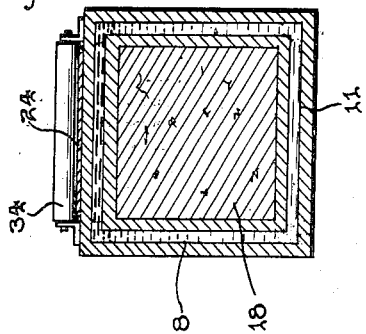
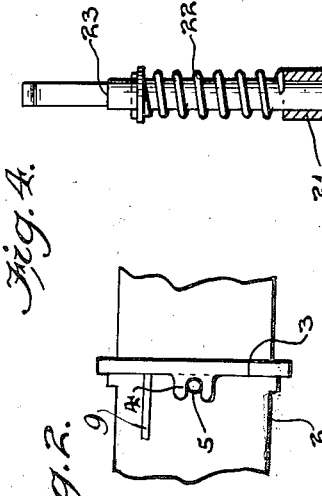
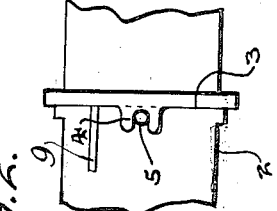
Inventor
O'Neal W. Chandler,
by Harry W. Johnson
Attorney Dec. 3, 1935.  O'NEAL W. CHANDLER  2,023,122
BUTTER SLICING MACHINE
Filed Sept. 14, 1931   3 Sheets-Sheet 3
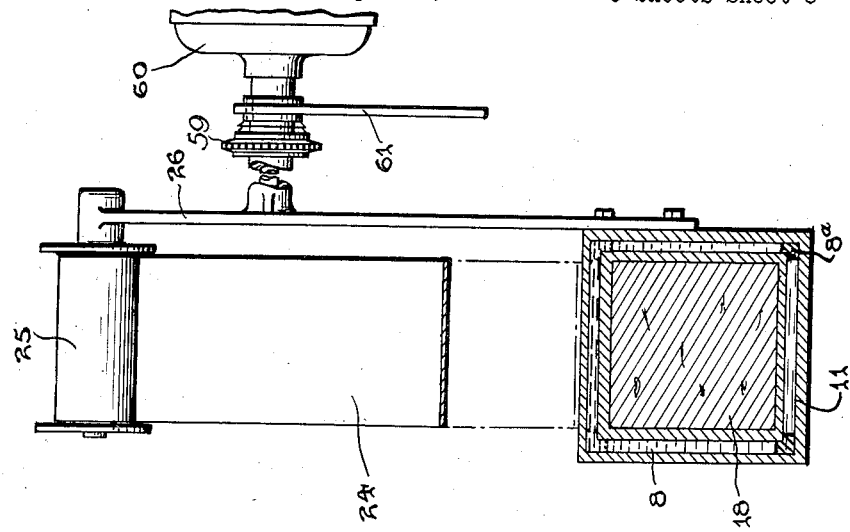
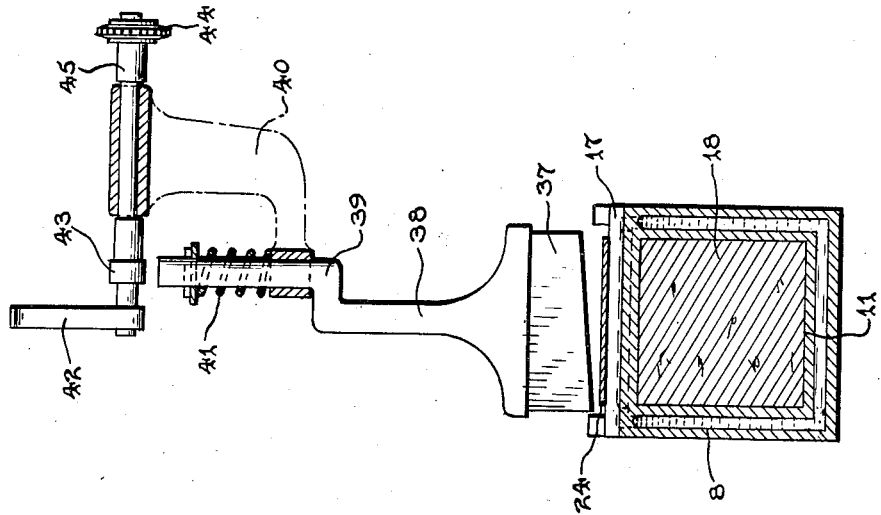
Inventor
O'Neal W. Chandler,
By Harry W. Johnson
Attorney Patented Dec. 3, 1935

2,023,122

UNITED STATES PATENT OFFICE 2,023,122

BUTTER SLICING MACHINE

O'Neal W. Chandler, Augusta, Ga.

Application September 14, 1931, Serial No. 562,767

7 Claims. (Cl. 31—14)

My invention relates to slicing machines, more particularly to slicing machines for cutting the standardized prints of butter into wafers of size convenient for individual use by the consumer, and it consists of the combinations, constructions, and arrangements herein shown and described.

Housekeepers, hotel and restaurant operators and the like are well acquainted with the difficulties of the time-wasting insanitary and inefficient method of slicing butter by hand in conventional use today. In this operation, the hand knife used by the servant or other person engaged in this work adheres to the butter, necessitating handling the same, a tremendous waste of time, usually the touching of the butter by the germ-laden hands of the operator, leading to the spread of disease and resulting in a product of irregular shape and size and unattractive in appearance. It is therefore a primary object of my invention to provide a device that will efficiently slice the butter into wafers of a size convenient for individual use by the consumer without necessitating the touching of the butter by human fingers or other objects, thus eliminating time-wasting and usually insanitary operations and resulting in a product that will be of uniform size and shape and attractive in appearance.

A further object of my invention is to provide a means for handling the individual wafers of butter after the cutting operation as well as assuring separation of the same subsequent to said operation, by the insertion therebetween of strips of paraffin paper or other suitable material.

My device is further designed to be used either in conjunction with present standard butter print machinery without great modification of said machinery or a disruption or lowering of the efficiency of the same, or as a separate unit for accomplishing its functions.

A yet further object of my invention is to provide a device of the type described which has few parts, does not get out of order easily, and is simple to manufacture.

Other objects and advantages will appear as the specification proceeds, and the invention will be more particularly defined in the appended claims.

My device is illustrated in the accompanying drawings forming a part of this application, in which Figure 1 is a longitudinal sectional view of a device according to my invention with parts thereof shown in elevation for clearness of illustration.

Figure 2 is a fragmentary detail view of a portion of the device,

Figure 3 is a sectional view on line 3—3 of Figure 1,

Figure 4 is a sectional view on line 4—4 of Figure 1,

Figure 5 is a sectional view on line 5—5 of Figure 1,

Figure 6 is a sectional view on line 6—6 of Figure 1, and

Figure 7 is a sectional view on line 7—7 of Figure 1.

In carrying out my invention, I make use of the butter compress incorporated in a standard butter print machine or detached therefrom if my device is to be used as a separate unit. This compress consists of an inner auger or worm, 1, operative within a die 2, the auger acting to force the butter from the standard butter print machine, if such is used, or some other source, such as a receptacle if my device is used as a separate unit, out of the mouth 3 of the die. It is to this mouth 3 that my device is attached. Suitable fasteners, such as the slot and bolt members 4 and 5, are used to accomplish this connection.

The tubular member 6 in my invention serves substantially as a prolongation of the die member 2 when attached to the mouth thereof. It has a wall 7 for close abutting relationship with the wall 3 of the die and extends axially relative thereto.

To facilitate passage of the butter through this tubular member 6 I provide means for raising the temperature of the same to a point above the temperature of the butter. This is accomplished by the cutting of channels 8 in the walls of said member and the passage of a fluid at a desired temperature through the channels. The channels extend substantially throughout the entire extent of the walls, there being ribs 8a extending between the inner and exterior portions of the walls of the member 6 for supporting the same in fixed relative position. The fluid of course circulates about these ribs. A suitable inlet 9 admits the fluid, while an outlet 10 allows the same to drain away. Connections of any suitable nature may be secured to the mouth 9 and the outlet 10 running from a source of fluid supply and disposal respectively, as is easily understood.

The floor 11 of this member 6 is lowered in its outer portion 12 for accommodating a system of rollers 13 mounted for rotation therein and extending in spaced parallel relationship transversely of said floor for support of the butter during certain operations thereon.

The top wall 14 of the member 6 is transversely slotted as indicated at 15 and cut away or raised beyond the slot as shown at 16 for operations that will soon be made clear. This top wall is further provided with a transverse recess 17 at a predetermined point in its exterior face for permitting certain operations. It is to this member 6 that the principal portions of my mechanism are secured. No support is shown for the member 6, as the same may be positioned on a table or any other suitable surface desired.

For cutting the butter 18 as the same is moved outwardly from the member 6 by the auger 1, I provide a blade 19 detachably mounted in a blade-supporting member 20, slidable in a frame 21 supported by the member 6. This blade-supporting member 20 is normally urged upwardly by the resilient means shown at 22, consisting of the coil spring and pin and washer abutment on the member 20. The upper extremity 23 of the member 20 is formed at an angle to the axis thereof to form a suitable cam surface. It will be noted that the blade 19 is adapted to pass through the slot 15 for cutting engagement with the butter therebeneath.

For placing the paraffin paper between the individual wafers of butter, a portion of such paper is positioned beneath the blade 19 during the cutting operation, to be carried downwardly by said blade. This paper 24 is supplied preferably from a roll 25 mounted on a supporting frame 26 secured to the body member 6. The paper is drawn into position beneath the blade 19 by means of a pair of cooperating rollers 27 and 28 formed of rubber or any other suitable material and adapted to closely contact the paper therebetween. These rollers are mounted on the top of the member 6 by means of the brackets 29. The upper roller is rotated by gear 30 driven by gear 31, which gear is driven by another gear 32 connected to the chain 33. The paper 24 is guided and held in position by rollers 34 and 35 and the side walls 35a on member 6. A stop for the end of the paper may be provided at a predetermined point as shown at 36. This point 36, by means of regulating the rate of rotation of rollers 27 and 28, may be so determined that the required size of paper necessary for the separation of the individual wafers will be attained. In the case of wafers cut from quarter-pound packages measuring one inch in depth, this has been set at 1⅛ inches so as to provide an overlapping of ⅛ inch for ease in handling of the paper. The position of the recess 17 is also determined by this size and is equal to the distance between the point 36 and the blade 19. It is at the recess 17 that the paper is cut before being interposed between the wafers. This is accomplished by means of a blade 37, having a slanting cutting edge to efficiently sever the paper at this point. The blade is detachably supported in an arm 38 having an offset portion as shown at 39. The arm is slidably supported in a frame portion 40 and is normally urged upwardly by the resilient means shown at 41, constituted by the spring and the pin and washer abutment on member 38. It is obvious that downward motion of the member 38 will cause the blade 37 to sever the paper at the recess 17.

The cutting blades 19 and 37 are forced downwardly simultaneously and in synchronism with the movements of the rollers 27 and 28 by means of the cams 42 and 43, respectively, mounted for rotation by gear 44 which is driven by the chain 33 which operates the rollers. These cams 42 and 43 are so proportioned and positioned on the shaft 45 that the movements of the blades 19 and 37 are simultaneous.

It is necessary, of course, that the forward motion of the butter 18 be halted during the downward stroke of blade 19. This is accomplished by driving the auger 1 from the chain 33 by the system of gearing shown in Figure 1. This gear system comprises intermeshing gears 46 and 47, shaft 48, the bevel pinion 49, the ring gear 50 having teeth throughout only half of its annulus, and the gear 51 driven by the chain 33. The gear 50 is so timed in its rotation relative to the rotation of the cam actuating the blade 19 that the untoothed portion thereof will not engage gear 49 and thus halt the forward motion of the butter when the blade 19 is driven downwardly to perform the cutting operation, and elevated after said cutting operation. The two members being driven by the same drive member make perfect synchronism an easy matter.

In the case of butter, which usually comes from the compress of the butter print machinery in the well-known quarter-pound form, it is desired to indicate these quarter-pound units for purposes of packaging, when my device is used. I have accomplished this by omitting the insertion of a paper strip at certain predetermined strokes of the cutting blade 19, so that the wafers of each quarter-pound quantity are separated into these quarter-pound units by an unpapered cut, thus enabling operators to easily separate the quarter-pound quantities. This is accomplished by mounting the shaft 52 which supports the gears 31 and 32 on a rod 53 slidably mounted in a supporting frame 37 as indicated at 54. The upper portion of this rod 53 is curved as shown at 55 to form a cam surface. This rod is normally urged downwardly by means of the spring 56. Cooperating with this portion 55, constituting the cam surface, is a pin 57 mounted on a gear 58 which is driven by the chain 33. In the case of quarter-pound quantities of butter, it is desired to omit the paper on every tenth stroke of the cutting blade. This gear 58 therefore bears a ratio to gears 51 and 44 of 10 to 1, so that on every tenth stroke of the blade it will bring the pin 57 into engagement with the cam follower 55 to raise the gear 31 out of engagement with the gear 30 and the gear 32 out of engagement with the chain 33 to stop rotation of the rollers 27 and 28, and consequently movement of the paper 24 forwardly during this tenth stroke. It will be obvious that as no paper is advancing beneath blade 19 when the rollers 27 and 28 are stationary, the blade 19 will sever the wafer of butter without placing the paper therebetween.

The chain 33 is driven by the gear 59 mounted on the frame 26, this gear being driven by motor 60 controlled by clutch 61.

From the foregoing description the operation of the device is easily understood. When the machine is set up as heretofore described and the compress attached either to the butter print machinery or a suitable butter supply receptacle, the operator has simply to start the motor 60 and throw in the clutch 61 to operate the device. The butter will then be brought forward by the auger 1 from the butter print machinery or receptacle and forced through the member 6. During this movement of the butter, the paper will be brought forward by means of the rollers 27 and 28 and the blades 19 and 37 will be set in operation. Butter will remain stationary during each cut of the blade 19 and will advance after each cut, the wafers 62 being forced along the rollers to a table for further operations or to an outer point for any purpose desired. The blade 37, performing its cutting operation simultaneously with the blade 19, will sever a strip of paper of the desired size for insertion in the cut upon the downward stroke of blade 19. The V-shaped strips 63 will assure separation of the wafers during this movement and prevent fusion of the same. The strips will also assure ease in handling as they will project above the wafers, this projection being accommodated by the cut-away portion 16. The pin 57 raising the rod 53 by means of the cam surface 55 on each tenth stroke of the blades, will prevent forward motion of the strip of paper and consequently the omission of the insertion of a strip in that particular cut. This will serve to indicate to the operator the quantity units desired. The spring 56 will urge the rod 53 downwardly after passage of the pin 57 to proceed with the paper inserting operation.

It is thus seen that I have provided a device that will efficiently slice the butter into wafers of a uniform size convenient for individual use by the consumer without necessitating manual operations of any kind by an operator, and so eliminating time-wasting and insanitary operations.

It is also seen that I have provided a simple means for handling the individual wafers of butter after the cutting operation by means of the insertion of strips of paper.

The usefulness of my device is further easily seen when it is considered that the same can be easily adapted to butter print machinery now in use without great modification thereof or a lowering of the efficiency of the same.

What I desire to claim and secure by Letters Patent is:

1. A machine for cutting butter and the like, comprising means for intermittently advancing a ribbon of butter, a blade for cutting the butter, means for feeding a strip of paper beneath said blade, and means for severing said paper, whereby upon actuation of said blade and said severing means, the butter is cut and a portion of the strip of paper is inserted in said cut.

2. A machine for cutting butter and the like, comprising means for intermittently advancing a ribbon of butter, a blade for cutting the ribbon of butter, cooperating rollers for advancing a strip of paper beneath said blade, a blade for severing said strip of paper in spaced relation to said first-named blade, and cams for actuating said blades simultaneously to sever the paper, cut the butter, and insert the cut-away portion of paper in the cut.

3. A machine for cutting butter and the like, comprising means for intermittently advancing a ribbon of butter, means for cutting a ribbon of butter, means for advancing a strip of paper beneath said cutting means, means for severing the strip of paper in spaced relationship to said butter cutting means for insertion of the cut-away portion of paper in the cut, and means for halting the advance of the paper during pre-determined strokes of said cutting means.

4. A machine for cutting butter and the like, comprising means for intermittently advancing a ribbon of butter, means for cutting the ribbon of butter, means for advancing a strip of paper beneath said cutting means, means for severing said strip of paper in spaced relationship to said cutting means for insertion of the cut-away portion of paper in the cut upon movement of the cutting means, a gear for driving said paper advancing means, means for driving said gear, a slidable rod for mounting said gear, means for normally urging said rod into gear engaging position, said rod having its upper portion curved to form a cam surface, and a pin for moving said rod to the gear disengaging position on predetermined strokes of the blade for halting the advance of the paper.

5. A machine for cutting butter and the like, comprising means for intermittently advancing a ribbon of butter, means for cutting the ribbon of butter, means for advancing a strip of paper beneath said cutting means, means for severing the strip of paper in spaced relationship to the cutting means for the insertion of the cut-away portion in the cut, a gear for driving said paper advancing means, means for driving said gear, and means for moving said gear out of engagement with its driving means on certain pre-determined strokes of the cutting means.

6. A machine for cutting butter and the like, comprising means for intermittently advancing a ribbon of butter, and means for cutting the butter and inserting a strip of paper between each cut, said means being adapted to perform the cut without the insertion of the paper on certain predetermined strokes.

7. A machine for cutting butter and the like, comprising means for advancing a ribbon of butter, means for cutting the ribbon of butter, means for advancing a strip of paper beneath said cutting means, means for severing said strip of paper in spaced relationship to said cutting means to insert the cut-away portion of the strip of paper in the cut upon the stroke of said cutting means, a channel for guiding said strip of paper, and rollers for holding the same in said channel.

O'NEAL W. CHANDLER.